(12) United States Patent  (10) Patent No.: US 12,005,444 B2
Liebsch et al.  (45) Date of Patent: Jun. 11, 2024

(54) SYSTEM FOR ANALYSIS OF A FLUID SAMPLE

(71) Applicant: PreSens Precision Sensing GmbH, Regensburg (DE)

(72) Inventors: Gregor Liebsch, Obertraubling (DE); Daniela Obermaier, Plattling (DE); Robert J. Meier, Nittendorf (DE); Achim Stangelmayer, Neuburg an der Donau (DE)

(73) Assignee: PRESENS PRECISION SENSING GMBH, Regensburg (DE)

( * ) Notice: Subject to any disclaimer, the term of this patent is extended or adjusted under 35 U.S.C. 154(b) by 708 days.

(21) Appl. No.: 17/145,167

(22) Filed: Jan. 8, 2021

(65) Prior Publication Data

US 2021/0178391 A1    Jun. 17, 2021

Related U.S. Application Data

(63) Continuation of application No. PCT/IB2019/054521, filed on May 31, 2019.

(30) Foreign Application Priority Data

Jul. 9, 2018  (EP) .................................... 18182520

(51) Int. Cl.
*B01L 3/00* (2006.01)
*G01N 21/64* (2006.01)

(52) U.S. Cl.
CPC .... *B01L 3/502715* (2013.01); *G01N 21/6408* (2013.01); *G01N 21/6445* (2013.01);
(Continued)

(58) Field of Classification Search
CPC ........... G01N 21/6408; G01N 21/6445; G01N 21/645; G01N 2021/6482;
(Continued)

(56) References Cited

U.S. PATENT DOCUMENTS

2012/0193555 A1  8/2012  Steel et al.
2012/0291515 A1* 11/2012 Stangelmayer ...... G01N 21/274
73/1.01

(Continued)

FOREIGN PATENT DOCUMENTS

DE  102010061182 B4  2/2013
DE  102011055272 A1  5/2013
(Continued)

OTHER PUBLICATIONS

International Search Report, from PCT/IB2019/054521, filed May 31, 2019, dated Sep. 16, 2019.
(Continued)

*Primary Examiner* — Michael A Lyons
(74) *Attorney, Agent, or Firm* — Patentbar International

(57) ABSTRACT

A system for analysis of a fluid sample has a carrier with a channel. A plug with a sensor can be inserted into a socket arranged on the carrier in such a way that the sensor is in contact with an interior volume of the channel. The sensor can be an optical sensor, in particular based on fluorescence. Optical fibres may be connected to the plug. A camera (8) may be provided to record an image of the plug. The carrier may in particular be a microfluidic chip and the channel a microfluidic channel.

12 Claims, 6 Drawing Sheets

(52) U.S. Cl.
CPC ...... *G01N 21/645* (2013.01); *B01L 2200/148* (2013.01); *B01L 2300/0627* (2013.01); *G01N 2021/6482* (2013.01); *G01N 2021/6484* (2013.01)

(58) Field of Classification Search
CPC ....... G01N 2021/6484; B01L 3/502715; B01L 2200/148; B01L 2300/0627
See application file for complete search history.

(56) References Cited

U.S. PATENT DOCUMENTS

| | | |
|---|---|---|
| 2013/0183660 A1 | 7/2013 | Yu et al. |
| 2016/0161705 A1 | 6/2016 | Marquardt et al. |

FOREIGN PATENT DOCUMENTS

| | | | | |
|---|---|---|---|---|
| DE | 102013108659 B3 | 7/2014 | | |
| DE | 102014107837 A1 | 12/2015 | | |
| DE | 102013109010 B4 | 3/2019 | | |
| EP | 2006022 A1 * | 12/2008 | ............ | B01L 3/0268 |
| EP | 2434272 A1 | 3/2012 | | |
| EP | 3199240 A1 | 8/2017 | | |
| WO | 2005083423 A2 | 9/2005 | | |
| WO | WO2011/120169 A1 | 10/2011 | | |
| WO | WO-2018025264 A1 * | 2/2018 | ........ | A61M 5/16804 |

OTHER PUBLICATIONS

Pasic, Fiber-optic flow through sensor for online monitoring of glucose Anal of Bioanal Chem, Pub. Oct. 10, 2006.
Vonau, Miniaturized Sensors for in situ measurement Wiley, Analytical Science, Pub. Jul. 8, 2012.
Andres, Fibre-optic pesticide biosensor based on immobilized acetylcholinesterase and thymol blue Talanta 44, Pub. Dec. 1997.
Weigl, Optical triple sensor for measuring ph, oxygen and carbon dioxide, Journal of biotechnology 32, Pub Dec. 1994.

* cited by examiner

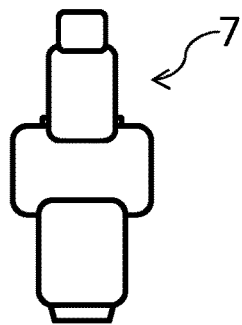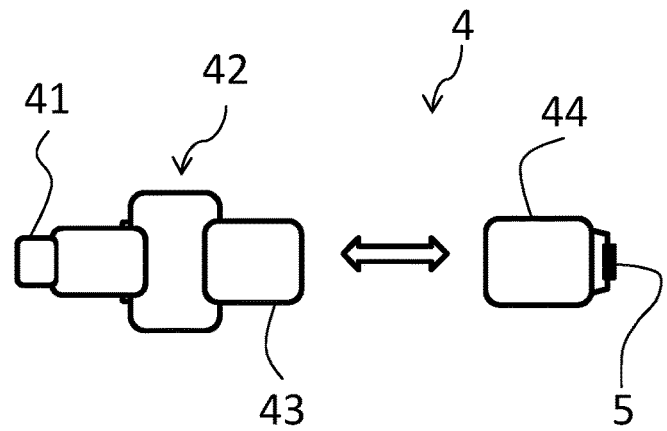
Fig. 5　　　　　　　　　　Fig. 6
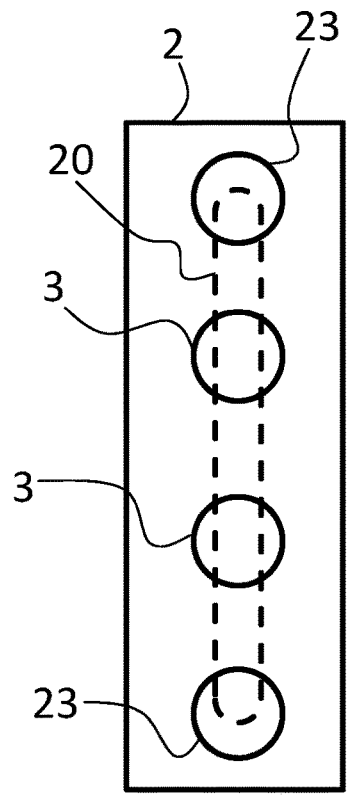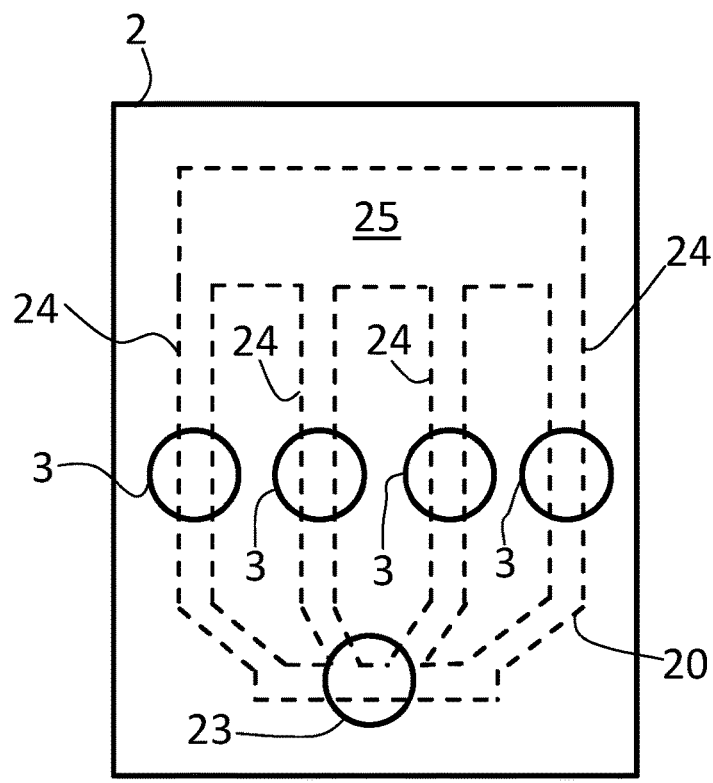
Fig. 7　　　　　　　　　　Fig. 8

SYSTEM FOR ANALYSIS OF A FLUID SAMPLE

RELATED APPLICATIONS

This Application is a Continuation Application of International Application PCT/IB2019/054521, filed on May 31, 2019, which in turn claims priority to European Application EP 18182520.9, filed Jul. 9, 2018, both of which are incorporated herein by reference in their entirety.

FIELD OF THE INVENTION

The invention relates to a system for analysis of a fluid sample, in which the sample is passed through and analysed in a channel.

BACKGROUND OF THE INVENTION

The analysis of samples is a task frequently to be performed in a wide variety of fields. Non-limiting examples include analysis of body fluids or tissue of a patient in a medical context, analysis of samples conducted for monitoring biological or non-biological manufacturing processes, analysis for pharmaceutical tests, analysis for environmental monitoring. Analysis of a sample generally refers to the determination of at least one variable of the sample, like a temperature, a pressure, a concentration or partial pressure of an analyte, i.e. of a substance contained in the sample, of which substance the concentration or partial pressure is of interest and therefore to be determined. As such analyses are to be carried out frequently, and often are of a routine nature, many approaches have been developed to carry out such analyses with little effort, with small sample volumes, and often for many samples in parallel. Devices used for such analyses include microtiter plates in the wells of which one or more sensor elements have been placed, or microfluidic devices, where samples are passed through microfluidic channels in which sensor elements have been placed. A sensor element typically is a patch of material in which a sensor substance is contained which is sensitive to an analyte. Suitable sensor substances for numerous analytes are known to the skilled person, as are methods to exploit such sensor substances for measurement of the respective analytes. As examples we refer to German patents DE 10 2010 061 182 B4, DE 10 2013 108 659 B3, DE 10 2013 109 010 B4, German patent applications DE 10 2011 055 272 A1, DE 10 2014 107 837 A1, and references cited therein.

For producing microfluidic chips currently one part of the chip is produced, and the sensor elements are applied on this part by e.g. gluing, plastic welding, or depositing material directly on the chip substrate. Then a counterpart of the chip is placed on the part carrying the sensor elements and sealed with it, only leaving openings for passing the sample and perhaps further fluids. This approach is complex, expensive, and lacks flexibility, as the chip is produced with a sensor configuration decided at production time without the possibility to make changes later.

SUMMARY OF THE INVENTION

The object of the invention therefore is to provide a system for analysis of a fluid sample which shows enhanced flexibility with respect to its sensor configuration even after production of the system. This object is achieved by a system according to claim 1. The dependent claims relate to advantageous embodiments.

The system for analysis of a fluid sample, where fluid means liquid or gaseous, according to the invention at least comprises a carrier with a channel for the fluid sample and a socket for a plug, wherein the socket is arranged on the carrier and is open towards the channel. In particular, the socket may provide a fluid connection between the channel and the environment of the carrier. According to the invention a plug is provided which can be plugged into the socket. The plug is carrying a sensor and is configured, in particular shaped, such that the sensor is in contact with an interior volume of the channel when the plug is plugged into the socket. In this way, when a sample is passed through the channel, the sensor is in contact with the sample. At the same time, the plug may close the channel towards the environment of the carrier, so that there is no leakage of sample out of the channel through the socket into the environment of the carrier. As a variety of plugs, with differing sensors, may be plugged into the socket, the desired flexibility of the system after manufacture of the system is achieved. It is only necessary to provide the required sensors, or plugs carrying the required sensors, the carrier can be used for any of them. The sensor carried by the plug may comprise one or more sensor elements, i.e. patches of material, possibly of multilayer configuration, containing a sensor substance sensitive to a variable of the sample, e.g. a concentration or partial pressure of an analyte. The sensor elements of a sensor may differ with respect to the sensor substance and/or the chemical environment of the sensor substance they contain. The sensor substances may differ with respect to the variable of the sample to which they are sensitive. The sensor substances may also differ with respect to a range of partial pressure or concentration of one and the same analyte within which range the respective sensor substances show a dependence on the particular analyte. Via the sensor substance sensitive to the analyte, or more generally sensitive to a variable of the sample, the sensor is sensitive to the analyte, or variable of the sample. The sensitivity of the sensor substance to the variable of the sample may be direct or indirect. In the case of direct sensitivity, the variable of the sample interacts directly with the sensor substance, without steps involving intermediary substances; for example, an analyte may interact directly with the sensor substance, the overall effects of such interaction depending on the concentration or partial pressure of the analyte. In the case of indirect sensitivity, the variable of the sample affects an environment of the sensor substance, and the sensor substance has direct sensitivity to a specific change in its environment. For example, the variable of the sample may be the partial pressure of the analyte carbon dioxide, and the sensor substance may be a dye sensitive to pH. If this dye is provided in a buffer solution the pH-value of which is changed by carbon dioxide, then via the buffer solution an indirect effect of carbon dioxide on the dye is established. The detailed configuration of sensor elements and corresponding transduction principles are known to the skilled person.

The sensor may also comprise one or more reference elements. A reference element may for example contain a sensor substance at a defined value of the concentration of an analyte which is to be measured by the sensor. The value of the concentration of the analyte in the reference element is not affected by the concentration of the analyte in the sample. Reference elements are an aid in the evaluation of raw measurement results and are used in calibration of measurements. Specific details of the configuration of various types of reference elements are known to the skilled person and are not the subject of this invention.

The carrier may for example be made of polydimethylsiloxane (PDMS), cyclic olefin copolymers (COC), or glass, but is not limited to these example materials. The carrier may also be made from more than one material, in particular, the carrier may have plural parts, where at least two parts differ with respect to the material they are made of.

In an embodiment the sensor has an optical behaviour dependent on at least one variable of the sample. In a particular configuration, this optical behaviour is due to a sensor substance included in a sensor element of the sensor. The optical behaviour of the sensor may be a luminescence behaviour, where luminescence includes at least fluorescence and phosphorescence. The dependence of the luminescence on the variable of the sample may for example be a dependence of colour, intensity, or polarisation of the luminescence light on the variable of the sample, or a dependence of a decay time of the luminescence on the variable of the sample, where the decay time may be the decay time of the intensity or of the polarisation of the luminescence. Several approaches are known to exploit such a dependence for measurement, usually with recourse to calibration data. A common feature is that the luminescence behaviour is excited by excitation light incident on the sensor, and that the optical response of the sensor, i.e. the luminescence light, is captured, e.g. by a detector. Output signals from the detector may be input into an evaluation unit (e.g. a suitably programmed data processing system) for determining at least one variable of the sample. Other types of optical behaviour are also possible, for example a colour of the sensor, a reflectivity of the sensor, a transmittance of the sensor may depend on a variable of the sample and may correspondingly be used for analysis of the sample.

In order to probe the optical behaviour, in one embodiment the plug either is connected to one or more optical fibres or is connectable to one or more optical fibres. Plural optical fibres may be bundled into a cable. The modular configuration in which the plug is connectable to one or more optical fibres, for example a cable, has the advantage that plug and cable can be exchanged independently, in case, e.g. of failure of one of them, or if either plug or cable need to be adapted to specific measurement requirements. The connection between the optical fibres and the plug may be by a known interface. Excitation light and an optical response from the sensor, e.g. luminescence light, can be guided via the one or more optical fibres. Within the plug, connected optical fibres may reach up to the sensor. Alternatively, a waveguide within the plug may optically connect the optical fibres to the sensor. In either case, the plug may involve coupling optics.

In an embodiment, the plug is transparent for a wavelength range relevant to the optical behaviour of the sensor. The wavelength range relevant to the optical behaviour of the sensor includes a wavelength range of light used to probe the optical behaviour, for example used to excite a luminescence behaviour, and a wavelength range of light corresponding to an optical response of the sensor, for example to luminescence light. Transparent here means that at least 80%, preferentially at least 90%, of the respective intensity of light incident on the plug gets transmitted through the plug.

To avoid stray signals from the environment, and in case the system includes plural plugs, also to avoid cross-talk between the plugs of the system, it is advantageous if a side wall of an otherwise transparent plug is opaque for the wavelength range relevant to the optical behaviour. Opaque means that at least 99% of the light incident on a side wall of the plug is blocked.

If transparent plugs are used, a camera may be provided to record an image of the plug. The camera includes a detector chip, e.g. CCD. Additionally, a light source may be provided to stimulate the optical behaviour of the sensor. For example, light from the light source may stimulate a luminescence behaviour of a sensor substance in the sensor, and the image of the plug recorded by the camera includes an optical signal representing luminescence light from the sensor.

In an embodiment, the sensor for a given plug is exchangeable. In a particular configuration, the sensor is fixed to a cap, and the cap may be removable from the plug. The sensor for the plug may be changed by changing just the cap.

It may occur that for some applications the presence of a sensor in the channel of the carrier is not desired. Therefore, in an embodiment, the system additionally comprises a stopper for closing the socket, so that the interior volume of the channel is not open to the environment via the socket. In particular the stopper may be shaped as the plug, only that the stopper does not carry a sensor, and does not require means for addressing the sensor, like optical fibres or interfaces for connecting optical fibres.

More than one socket may be arranged on the carrier, with each of the more than one socket open towards the channel; in particular, each socket may provide a fluid connection between the channel and the environment of the carrier. The channel may include a plurality of branches. With more than one socket, there may be a plug provided for each socket, the plugs differing by the sensor they are carrying. The sensors may differ with respect to the analyte (or more generally variable of the sample) to which they are sensitive, in which case plural analytes (or variables of the sample) may be targeted in parallel; i.e. the system may be used to measure more than one analyte (variable of the sample) simultaneously. Two or more of the sensors may be sensitive to the same analyte (or variable of the sample), but differ with respect to the range of concentration or partial pressure (or more generally, range of values) within which the respective sensor shows sensitivity to the analyte (variable of the sample). In this case the specific analyte (variable of the sample) may be measured over a wider range of concentration or partial pressure (or more generally, over a wider range of values) in one measurement run with one carrier than would be possible with only a single sensor. Non-limiting examples of analytes are pH, carbon dioxide, oxygen.

In embodiments the carrier is a microfluidic chip and the channel is a microfluidic channel. A microfluidic channel is a channel with at least one dimension of the channel below 1 mm; a microfluidic chip is a chip with at least one microfluidic channel. The socket may be shaped as a fluid port for a microfluidic chip, and in particular be of a standard configuration for such a fluid port. The plug may be shaped as a standard stopper for such a fluid port, apart from the sensor carried by the plug and in embodiments the connection to or interface for one or more optical fibres.

Generally speaking, the sensors in the system according to the invention may be precalibrated; in particular, the manufacturer may provide calibration data with each sensor. The sensors can be designed as disposables, i.e. they are dumped after a measurement. In this context it is particularly advantageous if the sensor is provided on a cap or as one or more sensor elements, because then only the cap or the sensor elements need to be disposed of. The sensors may be bio-compatible. The sensors may be provided in a sterile condition, as one or more sensor elements or on a cap; in the latter case, the entire cap would be provided in sterile condition. Of course, also the entire plug may be provided in a sterile condition. As, in embodiments, a plug with a sensor is to be inserted in a socket in the same way as a stopper for closing a fluid port, the plug with sensor may easily be designed in such a way that it does not affect the flow of a sample through the channel past the socket more than a stopper does affect the flow of the sample in the channel past the fluid port. Optical sensors, in particular luminescence based sensors, can operate without exposing the sample to an electrical potential. By providing the socket for the plug, and thus ultimately for providing a sensor to the system, on the carrier, there is the additional advantage, in comparison with providing sensors in separate tube sections, e.g. in a through-flow element, that no extra volume is added to the system. Additional volume requires additional fluid, here sample, to fill, so larger sample volumes would be required. With a system according to the invention, this is avoided.

BRIEF DESCRIPTION OF THE DRAWINGS

Below the invention and its advantages are described with reference to the accompanying schematic figures.

FIG. 5 shows a stopper.

FIG. 6 shows a plug with a sensor on a cap.

FIG. 7 is a top view of an example of a carrier of a system according to the invention.

FIG. 8 is a top view of another example of a carrier of a system according to the invention.

DETAILED DESCRIPTION OF THE PREFERRED EMBODIMENTS

The figures only show embodiments of the invention and do not limit the invention to the specific embodiments shown.

Figure 1:
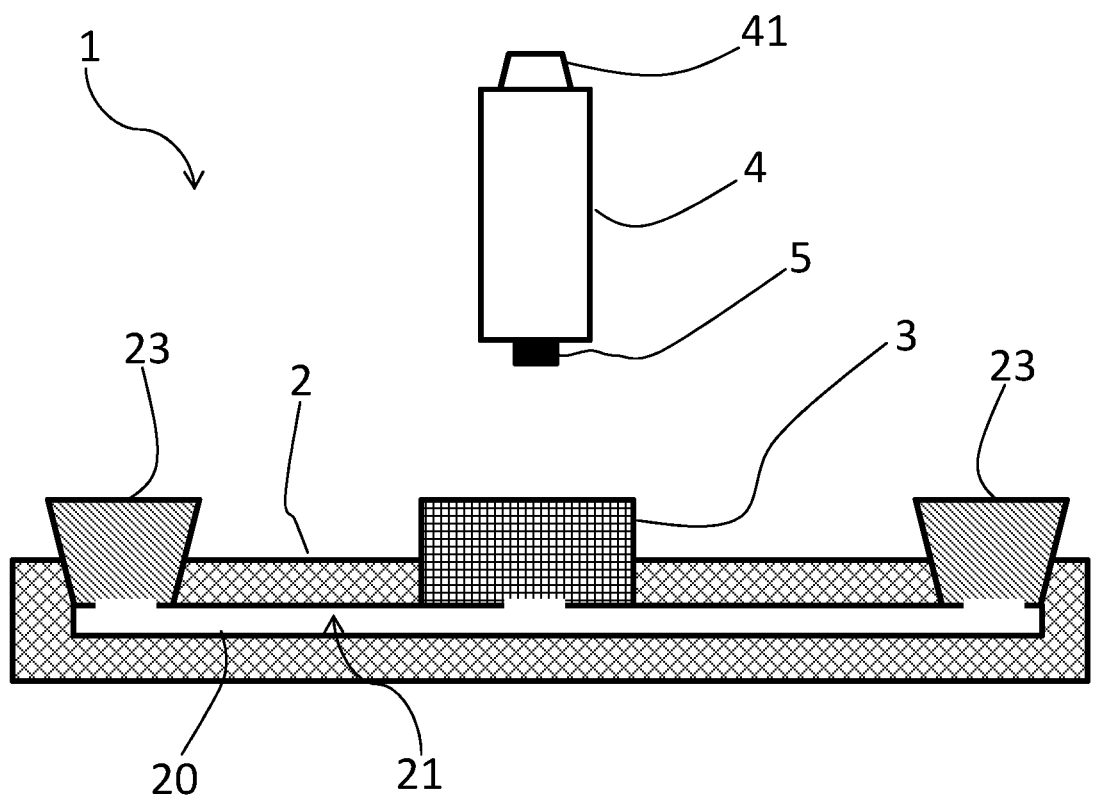
FIG. 1 shows an example of a system according to the invention.

FIG. 1 shows an embodiment of a system 1 for analysis of a fluid sample, according to the invention. The system 1 has a carrier 2 with a channel 20. A socket 3 is arranged on the carrier 2 and open to an interior volume 21 of the channel 20. The socket 3 is configured to receive a plug 4. The plug 4 is carrying a sensor 5, and in this embodiment also has an interface 41 for connecting one or more optical fibres. The carrier 2 also has fluid ports 23 for passing fluid into and removing fluid from the channel 20, so that a flow of fluid through the channel 20 can be generated. In different embodiments an outlet from the carrier 2 may be of a configuration different from the configuration of a fluid port 23. Some carriers 2 may also contain reservoirs for receiving and storing fluid that has been passed through channel 20.

Figure 2:
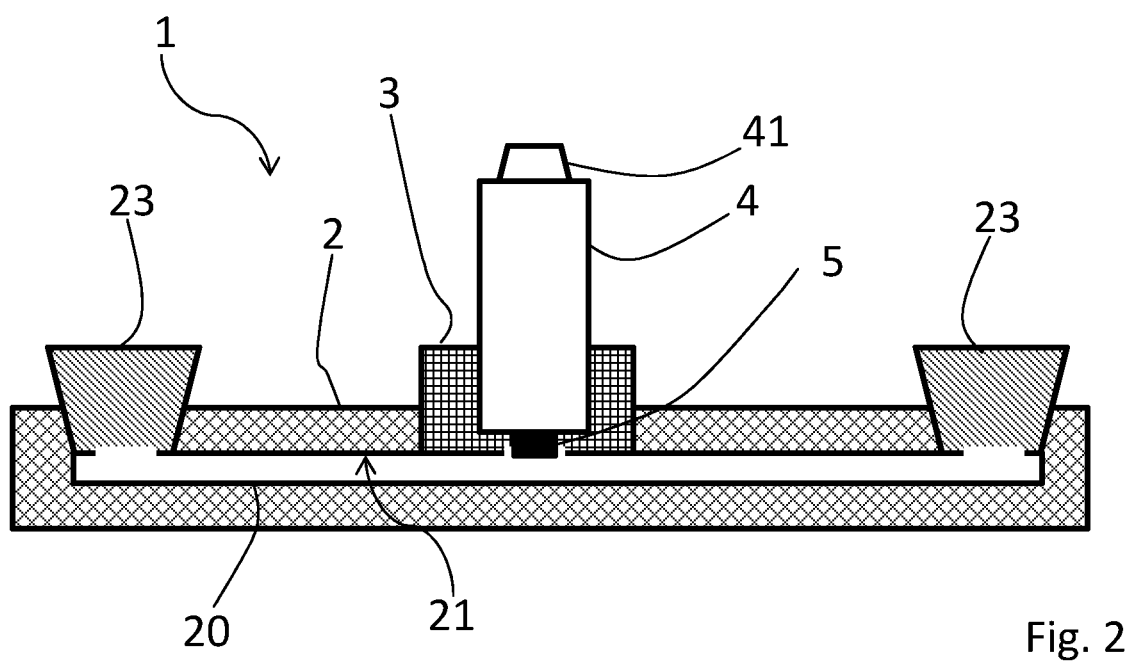
FIG. 2 again shows the system shown in FIG. 1, with the plug plugged into the socket.

FIG. 2 shows the same system 1 as shown in FIG. 1. Here, however, the plug 4 is plugged into socket 3. As can be seen, in this position of the plug 4 the sensor 5 is in contact with the interior volume 21 of the channel 20. This in particular means that a fluid sample flowing through the channel 20 is in contact with the sensor 5, so that the sensor 5 can be used in an analysis of the fluid sample.

Figure 3:
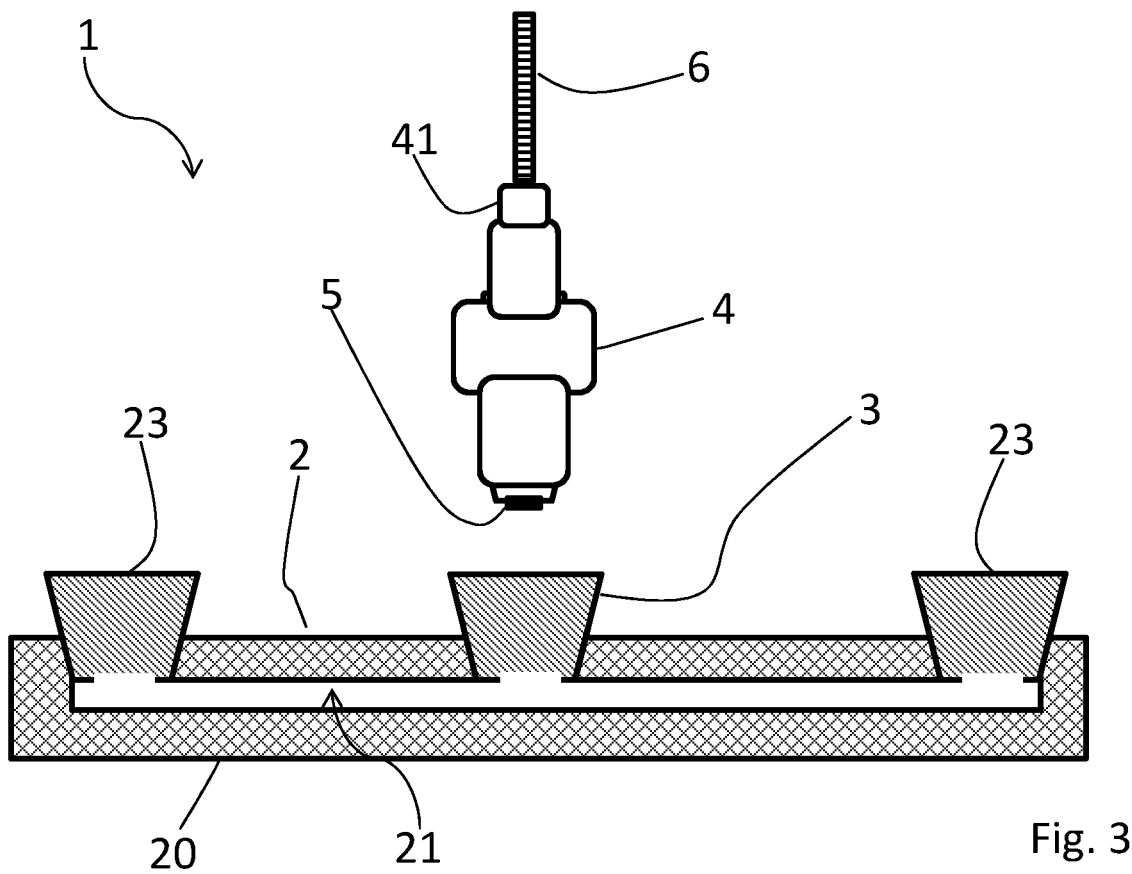
FIG. 3 shows a further example of a system according to the invention.

FIG. 3 shows a further example of a system 1 according to the invention. Contrary to the example shown in FIGS. 1 and 2, here the socket 3 is of the same configuration as the fluid ports 23, actually the socket 3 just is a further fluid port, intended, however, for a different purpose, i.e. to serve as socket 3 for plug 4. The plug 4 carries a sensor 5 and via interface 41 an optical fibre 6 (which is only partially shown) is connected to the plug 4. Preferentially, the fluid ports 23, and thus here also the socket 3, are of a standard configuration, for example ports for a Luer-connector or a mini-Luer-connector. Correspondingly, the plug 4 may be shaped as a standard connector, for example as a Luer-connector or mini-Luer-connector, respectively. In a particular example, carrier 2 is a microfluidic chip and channel 20 a microfluidic channel; ports 23 are standard ports for microfluidic chips and plug 4 is shaped as a standard connector for such a standard port, for example as a Luer-connector or a mini-Luer-connector.

Figure 4:
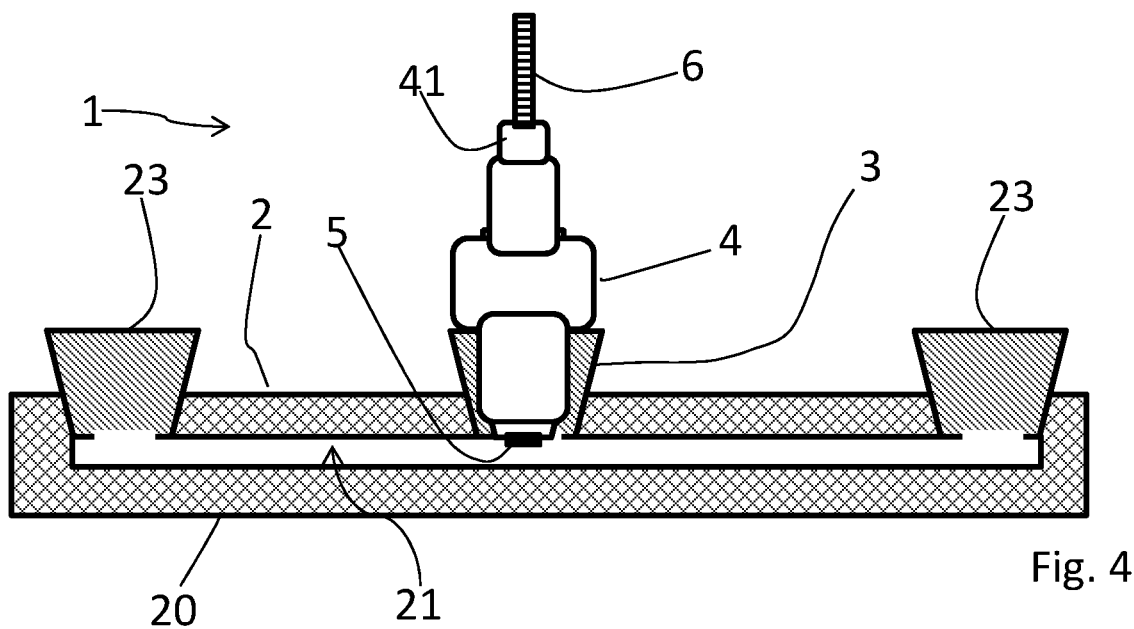
FIG. 4 again shows the system shown in FIG. 3, with the plug plugged into the socket.

FIG. 4 shows the same system as shown in FIG. 3. Here, however, the plug 4 is plugged into socket 3. As can be seen, in this position of the plug 4 the sensor 5 is in contact with the interior volume 21 of the channel 20. This in particular means that a fluid sample flowing through the channel 20 is in contact with the sensor 5, so that the sensor 5 can be used in an analysis of the fluid sample.

FIG. 5 shows a stopper 7 for closing a fluid port 23 or a socket 3 in embodiments of the system shown in FIGS. 3 and 4. The stopper 7 is shaped as the plug 4, except that the stopper 7 does not carry a sensor and has neither a connection to optical fibres nor means for connecting to optical fibres. The stopper 7 may in particular be a standard stopper for the fluid ports 23.

FIG. 6 shows a plug 4 comprising a main body 42 and a cap 44 detachable from the main body 42. The cap 44 carries a sensor 5. The main body 42 has a cap holder 43. The cap 44 can be pushed over the cap holder 43 and secured to the cap holder 43 and thus to the main body 42 by e.g. friction, screw threads, a bayonet mount. In this embodiment, in order to use a different sensor 5, only the cap 44 needs to be changed. The plug 4 shown here further has an interface 41 for connecting one or more optical fibres on the main body 42.

FIG. 7 shows a top view of an example of a carrier 2 of a system according to the invention. Indicated by dashed lines is the channel 20 within the carrier 2. The carrier 2 has two fluid ports 23 providing a fluid connection to the channel 20. The carrier 2 furthermore has two sockets 3, for plugs 4. For a measurement, in each of the sockets 3 a respective plug 4 may be inserted. For a different measurement, a plug 4 is inserted in only one of the sockets 3, while the other socket 3 is closed with a stopper 7. For yet other applications, both sockets 3 may be closed with a stopper 7 each.

FIG. 8 shows a top view of an example of another carrier 2 of a system according to the invention. Indicated by dashed lines is the channel 20 within the carrier 2; in this example, the channel 20 has a plurality of branches 24, here four. The carrier 2 has a fluid port 23 providing a fluid connection to the channel 20. For each of the branches 24 a socket 3 is provided. Each of the sockets 3 can be closed with a stopper 7, if the specific measurement application the system is used for does not require a plug 4 with a sensor 5 in the respective socket 3. One or more of the sockets 3 may have a plug 4 with a sensor 5 plugged into them, if the specific measurement application so requires. The branches 24 lead to a common receptacle 25 provided in the carrier 2. The receptacle 25 is to receive the fluid sample after it has passed the sockets 3.

Figure 9:
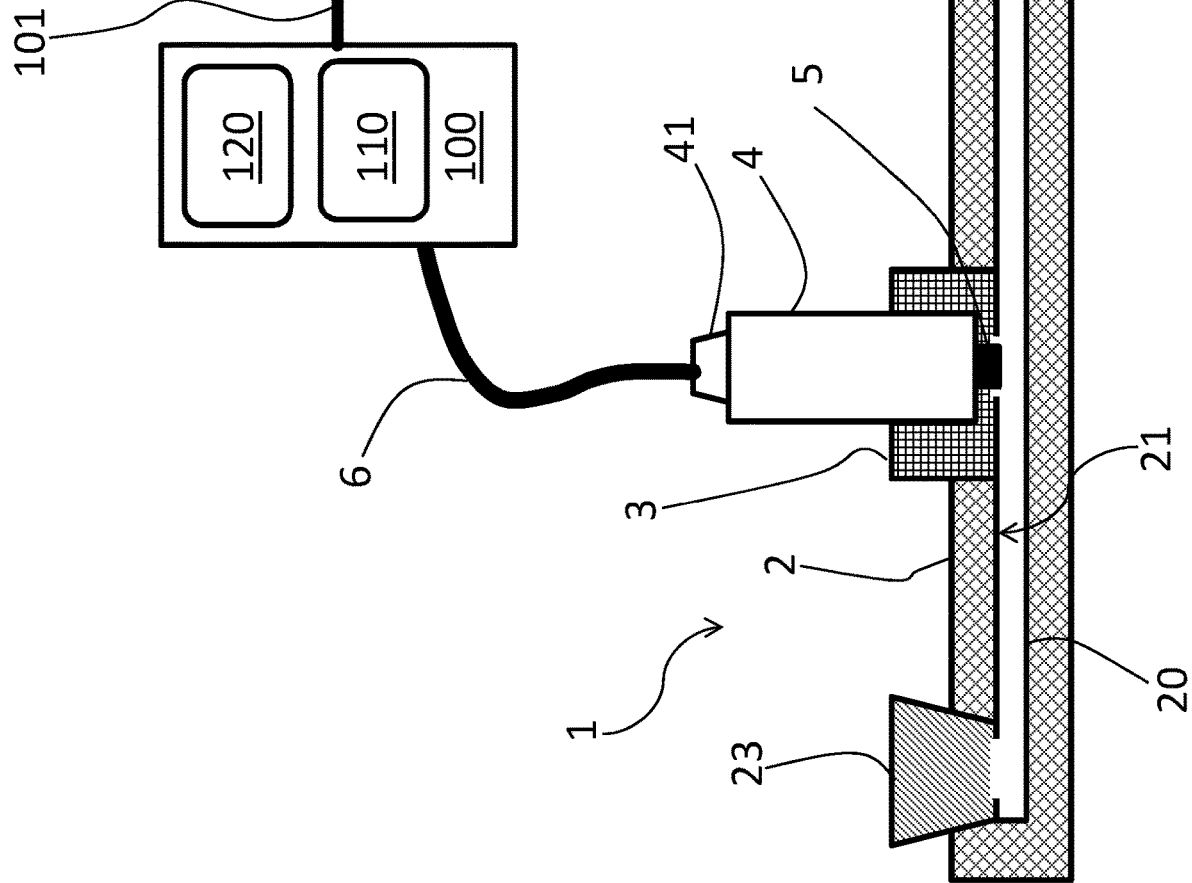
FIG. 9 shows an example of the system according to the invention as part of a measurement setup.

FIG. 9 shows an example of a system 1 according to the invention, as described with respect to FIGS. 1 and 2, as part of a measurement setup. The measurement setup shown is just an example and not intended as a limitation of the invention. Sensor 5 of system 1 here has a luminescence behaviour which depends on an analyte. An optical fibre 6 connects interface 41 of plug 4 with an optical unit 100. The optical unit 100 includes a light source 110 for feeding excitation light for the sensor 5 into the optical fibre 6. The optical unit 100 furthermore includes a detector 120 for receiving luminescence light from the sensor 5 via optical fibre 6 and for producing electrical signals in response to the luminescence light. The electrical signals in particular may carry information on the intensity and/or polarisation of the luminescence light as a function of time. The optical unit 100 via data link 101 is in communication with evaluation unit 200. The evaluation unit 200 is configured to receive the electrical signals from the detector 120 and to determine at least one variable of a sample passed through channel 20 from the electrical signals. To this end, the evaluation unit 200 uses a processor 210 coupled to a memory 220. The memory 220 at least contains program instructions 221 that specify the operation of the evaluation unit 200, and calibration data 222 for the sensor 5. The calibration data 222 are used along with the electrical signals from detector 120 to determine the at least one variable of the sample. The evaluation unit 200 furthermore is configured to control the operation of light source 110 in optical unit 100; this is also achieved via processor 210 and program instructions 221. The evaluation unit 200 may for example be a personal computer with suitable application software; the data link may for example be a USB-connection, a network cable or a wireless connection. Different implementations, including an evaluation unit that is a dedicated device, like e.g. a special purpose computer, also are possible. As an alternative to the configuration shown, optical unit 100 and evaluation unit 200 may be integrated into a single device.

Figure 10:
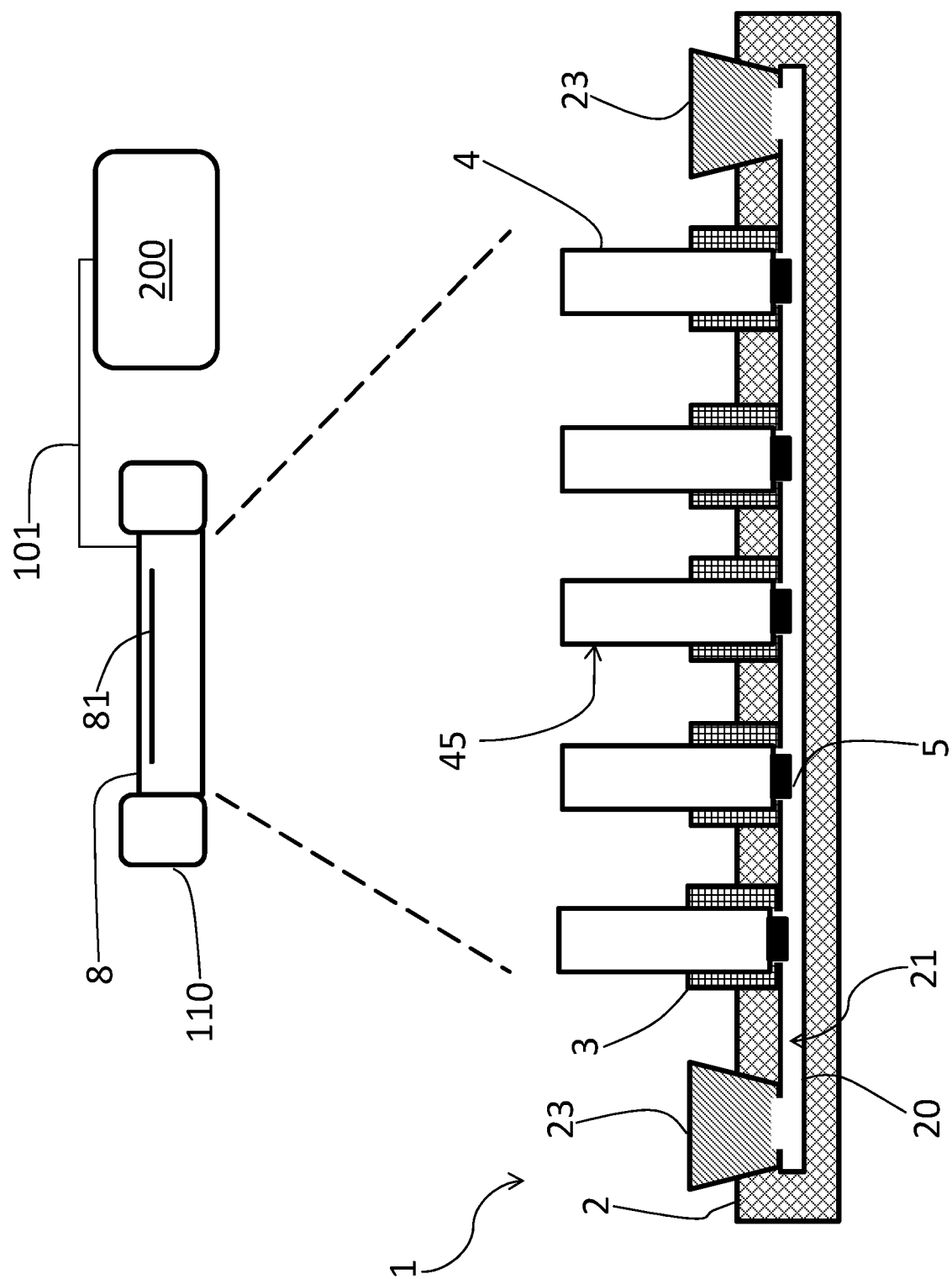
FIG. 10 shows another example of the system according to the invention as part of a measurement setup.

FIG. 10 shows an example of a system 1 according to the invention as part of a further measurement setup. A carrier 2 has a channel 20 and fluid ports 23, as described with relation to previous figures. In the example shown, five sockets 3 are arranged on the carrier 2, and in each socket 3 a plug 4 is inserted. Each plug 4, according to the invention, carries a sensor 5. In the plugged state shown in FIG. 10, each sensor 5 is in contact with an interior volume 21 of the channel 20. A camera 8 with detector chip 81 is provided to record an image of the plugs 4. A light source 110 is provided to emit light to probe an optical behaviour of the sensors 5. A portion of the light emitted by the light source 110 passes through the plugs 4 to the sensors 5. An optical response of the sensors 5, e.g. luminescence light, passes through the plugs 4 and can be captured by camera 8 as optical signals. The detector chip 81 converts the captured optical signals into electrical signals. Via data link 101 the electrical signals are passed to evaluation unit 200. Evaluation unit 200 is configured as discussed with respect to the measurement setup shown in FIG. 9. In this embodiment of the system 1, the plugs 4 are pieces of material transparent to light from the light source 110 and to an optical response from the sensors 5. Here transparent means that the plugs let pass sufficient light from the light source and of the optical response so that an evaluation can be done; this depends on the specific measurement requirements. It is advantageous if side walls 45 of the plugs 4 are opaque to light, to avoid optical cross-talk between the individual plugs 4 and stray signals from the environment. Transparent and opaque may also be defined in terms of the percentages given to this end in the general part of the description.

Figure 11:
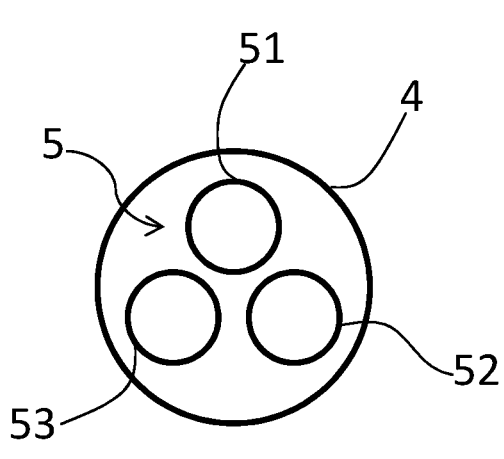
FIG. 11 shows a sensor on a plug.

FIG. 11 shows a top view of a face of a plug 4 carrying a sensor 5. The sensor 5 here has three sensor elements, 51, 52, 53. Each sensor element 51, 52, 53 may contain a different sensor substance, and via this sensor substance for example exhibit an optical behaviour dependent on a respective analyte. For example, sensor element 51 may have an optical behaviour dependent on pH, sensor element 52 may have an optical behaviour dependent on partial pressure of carbon dioxide, and sensor element 53 may have an optical behaviour dependent on partial pressure of oxygen.

Figure 12:
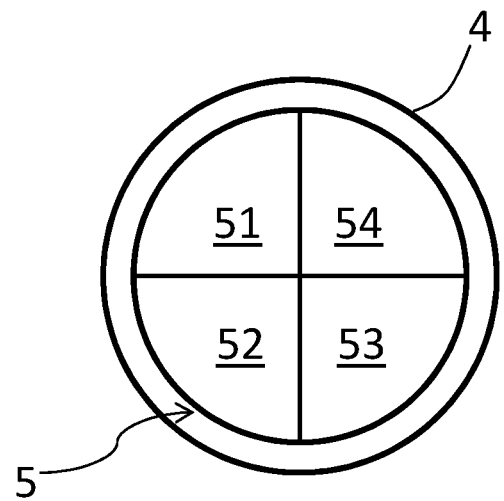
FIG. 12 shows a sensor on a plug.

FIG. 12 shows a top view of a face of a further plug 4 carrying a sensor 5. The sensor 5 here has three sensor elements, 51, 52, 53, and a reference element 54. In analogy to what has been discussed in relation to FIG. 11, each sensor element 51, 52, 53 may contain a different sensor substance, and in this way exhibit a sensitivity to a respective analyte. FIGS. 11 and 12 show that the shape and arrangement of the sensor elements of a sensor may vary between embodiments. Also the number of sensor elements and reference elements of a sensor may vary between embodiments. In one embodiment, a sensor may only have one sensor element. In different embodiments, a sensor may have two, three, four, or even more than four sensor elements. In one embodiment, a sensor may have no reference element. In different embodiments, a sensor may have one, two, three, or even more than three reference elements.

Figure 13:
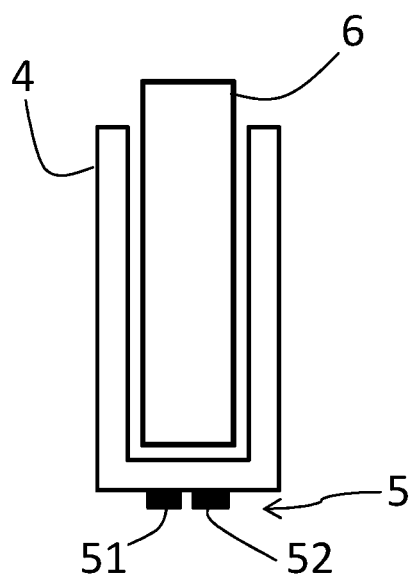
FIG. 13 shows a plug with an optical fibre.

FIG. 13 shows a section through a plug 4 in which an optical fibre 6 (only partially shown) has been inserted. The optical fibre 6 is provided to address the sensor 5 on the plug 4. The sensor 5 here has two sensor elements 51, 52, and the optical fibre 6 addresses both sensor elements 51, 52, by guiding excitation light to the sensor elements 51, 52, and guiding an optical response from the sensor elements 51, 52 to a detector, e.g. a detector 120 as shown in FIG. 9. If the sensor elements 51, 52 differ with respect to a wavelength range of excitation light they require, the two sensor elements 51, 52 may be excited selectively by passing light of the appropriate wavelength along the optical fibre 6 to the sensor 5. If such a selective excitation is not possible, e.g. because the wavelength ranges of excitation light for the two sensor elements 51, 52 coincide or significantly overlap, or is not desired, optical responses from the sensor elements 51, 52 may in embodiments be distinguished by their wavelengths, e.g. by employing suitable filters for a detector like detector 120 in FIG. 9.

Figure 14:
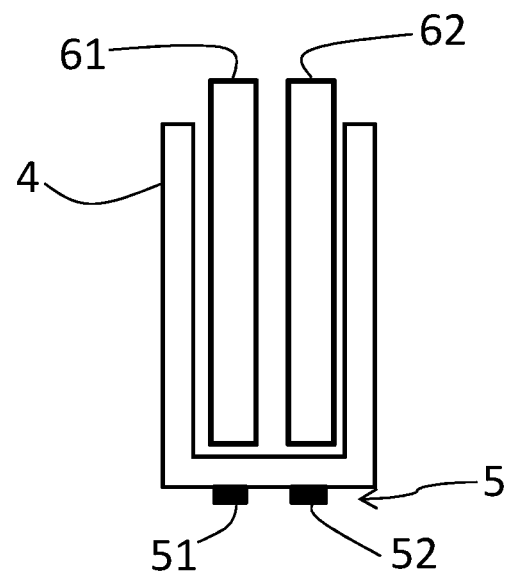
FIG. 14 shows a plug with two optical fibres.

FIG. 14 shows a section through a plug 4 in which two optical fibres 61 and 62 (only partially shown) have been inserted. The optical fibres 61, 62 are provided to address the sensor 5 on the plug 4. The sensor 5 here has two sensor elements 51, 52, and the optical fibre 61 addresses sensor element 51, while the optical fibre 62 addresses sensor element 52, in each case by guiding excitation light to the respective sensor element 51, 52 and guiding an optical response from the respective sensor element 51, 52 to a detector, e.g. a detector 120 as shown in FIG. 9.

LIST OF REFERENCE NUMERALS 1 system
2 carrier 3 socket
4 plug
5 sensor
6 optical fibre
7 stopper
8 camera
20 channel
21 interior volume (of channel)
23 fluid port
24 branch (of channel)
25 receptacle
41 interface (for optical fibres)
42 main body
43 cap holder
44 cap
45 side wall (of plug)
51 sensor element
52 sensor element
53 sensor element
54 reference element
61 optical fibre
62 optical fibre
81 detector chip
100 optical unit
101 data link
110 light source
120 detector
200 evaluation unit
210 processor
220 memory
221 program instructions
222 calibration data

What is claimed is:

1. A system for analysing a fluid sample, the system comprising:
a carrier with a microfluidic channel for the fluid sample, the carrier being a microfluidic chip;
a socket for a plug, wherein the socket is arranged on the carrier and is open towards the channel;
the plug for plugging into the socket, the plug carrying a sensor and configured such that the sensor is in contact with an interior volume of the channel when the plug is plugged into the socket, wherein the sensor has an optical behaviour dependent on at least one variable of the sample;
wherein the sensor comprises one or more sensor elements, a sensor element being a patch of material containing a sensor substance, and wherein the sensor substance is a substance having the optical behaviour dependent on at least one variable of the sample.

2. The system of claim 1, wherein the plug is connected to or connectable to one or more optical fibres.

3. The system of claim 1, wherein the plug is transparent for a wavelength range relevant to the optical behaviour.

4. The system of claim 3, wherein a side wall of the plug is opaque for the wavelength range relevant to the optical behaviour.

5. The system according to claim 1, wherein the sensor comprises a reference element.

6. The system of claim 1, wherein the sensor is fixed to a cap, and the cap is removable from the plug.

7. The system of claim 1, further comprising a stopper for closing the socket when the plug is not plugged into the socket.

8. The system of claim 7, wherein the stopper is of the same shape as the plug.

9. The system of claim 1, wherein more than one socket is arranged on the carrier, each of the more than one socket is open towards the channel.

10. The system of claim 1, wherein the channel comprises a plurality of branches.

11. The system of claim 1, wherein the socket is shaped as a fluid port for the microfluidic chip.

12. The system of claim 11, wherein the plug is shaped as a stopper for the fluid port.

* * * * *